(12) United States Patent
Pan

(10) Patent No.: US 12,514,291 B2
(45) Date of Patent: Jan. 6, 2026

(54) PORTABLE EVAPORATOR

(71) Applicant: Shenzhen YLLVAPE Technology Co., Ltd, Shenzhen (CN)

(72) Inventor: Xiaohong Pan, Suixian (CN)

( * ) Notice: Subject to any disclaimer, the term of this patent is extended or adjusted under 35 U.S.C. 154(b) by 696 days.

(21) Appl. No.: 18/054,025

(22) Filed: Nov. 9, 2022

(65) Prior Publication Data

US 2024/0148061 A1 May 9, 2024

(51) Int. Cl.
| | |
|---|---|
| *A24F 40/46* | (2020.01) |
| *A24F 40/95* | (2020.01) |
| *H05B 3/00* | (2006.01) |

(52) U.S. Cl.
CPC .............. *A24F 40/46* (2020.01); *A24F 40/95* (2020.01); *H05B 3/0033* (2013.01)

(58) Field of Classification Search
CPC .................................. A24F 40/46; A24F 40/95
See application file for complete search history.

(56) References Cited

U.S. PATENT DOCUMENTS

| | | | | |
|---|---|---|---|---|
| 2019/0001086 | A1* | 1/2019 | Garthaffner | A61M 11/042 |
| 2020/0113244 | A1* | 4/2020 | Novak, III | A61M 15/06 |
| 2020/0154768 | A1* | 5/2020 | Han | A24F 40/60 |
| 2020/0154776 | A1* | 5/2020 | Lee | H05B 3/03 |

FOREIGN PATENT DOCUMENTS

| | | | | |
|---|---|---|---|---|
| CN | 108208938 A | * | 6/2018 | C04B 35/10 |
| WO | WO-2019073004 A1 | * | 4/2019 | H05B 3/04 |
| WO | WO-2024094655 A1 | * | 5/2024 | A24F 40/20 |

* cited by examiner

*Primary Examiner* — Woody A Lee, Jr.

(57) ABSTRACT

A portable evaporator is disclosed. The portable evaporator includes an upper cover, a housing and a lower cover. Upper and lower ends of the housing are fixedly connected with connecting posts, the lower end of the housing is fixedly connected with the lower cover through the connecting posts, and the upper end of the housing is fixedly connected with a fastener through a first fixing screw. A middle of a lower end of the fastener is fixedly connected with an insulation part, and a lower end of the insulation part is fixedly connected with a metal container, an outer wall of the metal container is fixed with a halogen lamp. The heating appliance uses the halogen lamp as a heat source inside, which can work at a higher temperature.

8 Claims, 11 Drawing Sheets

PORTABLE EVAPORATOR

TECHNICAL FIELD

The present application relates to the technical field of heating appliance, in particular to a portable evaporator.

BACKGROUND

Halogen lamps are also known as halogen tungsten lamps. The halogen lamps are a thermal radiation light source, a glass shell of the halogen lamps is filled some halogen element gas, and a working principle thereof is: when filaments heat up, tungsten atoms are evaporated and then move toward a wall of a glass tube, when close to the wall of the glass tube, tungsten vapors are cooled to about 80 TC and then combined with halogen atoms to form tungsten halide (tungsten iodide or tungsten bromide), tungsten halide continues to move toward a center of the glass tube and goes back to an oxidized filament. Since tungsten halide is a very unstable compound, it decomposes again into halogen vapors and tungsten when exposed to heat, so that tungsten is deposited on the filaments again to make up for evaporated portions. Through this regenerative cycle process, the service life of the filaments is not only greatly extended, but at the same time, due to the filaments working at high temperature, brightness, color temperature and luminous efficiency those better than incandescent lamps are achieved.

Currently, halogen lamps have partially replaced the incandescent lamps as a lighting tool due to their higher brightness and longer service life than the incandescent lamps. However, while using the higher brightness of the halogen lamps, lack of utilization of heat energy generated during its work is a loss.

Heat conversion efficiency of the halogen lamps is usually used for heating, because about 80% of input energy is converted to heat rays, traditional heating appliances are only use of three major heating principles for conduction heating, heat utilization efficiency is low, and heat sources of the traditional heating appliances are generally located around an object to be heated, it is difficult to achieve a same heating effect inside and outside for a set temperature and time.

In view of above problems, it is necessary to propose an all-round heating appliance, which uses an infrared heater as a heat source and makes full use of three major heating principles, for conduction heating, convection heating and radiation heating, so that inside and outside of a heated object are evenly heated to achieve uniform heating.

SUMMARY

I. Technical Problems to be Solved

For the inadequacy of existing technologies, the present disclosure provides a portable evaporator, which can carry out all-round uniform heating, heating effect is better, thus solving the problems that traditional heating appliances are only use of the three major heating principles for conduction heating, heat utilization efficiency is low. Furthermore, the present disclosure also solves the problems of difficult to achieve a consistent heating effect inside and outside for a set temperature and time because the heating sources of the traditional heating appliance are generally located around the object to be heated.

II. Technical Solutions

To achieve above purposes, the present disclosure is realized by following technical solutions. A portable evaporator, including an upper cover, a housing and a lower cover. Upper and lower ends of the housing are fixedly connected with connecting posts, the lower end of the housing is fixedly connected with the lower cover through the connecting posts, and the upper end of the housing is fixedly connected with a fastener through a first fixing screw. A middle of a lower end of the fastener is fixedly connected with an insulation part, and a lower end of the insulation part is fixedly connected with a metal container, an outer wall of the metal container is fixedly connected with a halogen lamp, the halogen lamp outside is nested with spherical beads, and an outer wall of the spherical beads are movable provided with a ceramic lamp holder. A lower end of the metal container is fixedly connected with an airway silica gel, a lower end of the airway silica gel is fixedly connected with a bottom airway, and both sides of the airway silica gel each is fixedly provided with a battery electrode.

A side of an upper end of the upper cover is rotationally connected with a rotary shaft, and a side of the rotary shaft is fixedly connected with a nozzle. A side of an lower end of the upper cover is fixedly provided with a rotary shaft silicone sealant, and the rotary shaft silicone sealant is arranged opposite to the rotary shaft. The lower end of the upper cover is fixedly provided with a seal, and a middle of a lower end of the seal is fixedly provided with a rotating fastener.

The lower cover is fixedly provided with a PCBA circuit board inside, the PCBA circuit board is electrically connected with the halogen lamp, and the lower cover is fixedly connected with the housing through a second fixed screw.

Through above technical solutions, by using the halogen lamp as a heat source inside the heating appliance, and due to a higher melting point of tungsten filaments, thereby enables the heating appliance to work at higher temperatures, and obtain a higher brightness, color temperature and luminous efficiency than incandescent lamps. Furthermore, because the halogen lamp has a higher brightness and longer service life than incandescent lamps, thus extending the service life of the heating appliance.

The metal container with high thermal conductivity is provided inside the heating appliance and a through-hole is opened at the upper end thereon. The top makes radiant energies to reach to atomized materials directly by the halogen lamp, to achieve the effect of heating by using radiation. Moreover, the metal container itself as a high thermal conductivity metal can also conduct the heat around the halogen lamp to the atomized materials, and then achieve the effect of conduction heating. And the spherical beads are arranged outside the halogen lamp, the spherical beads may be glass beads or ceramic beads, etc., which can absorb the conduction heat stored in around the halogen lamp. During suction, the cold airflow through the spherical beads into the hot airflow to reach the atomized materials, and then achieve the effect of convection heating.

Preferably, the battery electrode on an upper end is fixedly provided with a battery, and the battery on an upper end is sleeved with a battery cover, the battery cover is threaded with an upper end of the fastener.

By means the technical solutions above, the battery cover and the fastener are threaded connection, which can easily take and replace the battery inside, the use effect is much better.

Preferably, both sides of an upper end of the seal are fixedly provided with magnets.

By means the technical solutions above, the magnets can be attached to the iron battery cover, making the entire nozzle assembly easily removable, thus facilitating the addition of the atomized materials to inside of the metal container.

Preferably, a lower end of the rotating fastener is fixedly provided with an air-passing part, and a bottom of the air-passing part is connected to a top of the insulation part.

By means the technical solutions above, the air-passing part is fixed by riveting on the rotating fastener and can be connected with lower end of the insulation part, so that the air passage inside the metal container is connected with the air passage inside the upper cover.

Preferably, a side of the lower cover is fixedly provided with a switch button, and other side of the lower cover that away from the switch button is fixedly provided with a charging port, and the switch button and the charging port each is electrically connected with the PCBA circuit board.

By means the technical solutions above, the switch button controls the PCBA circuit board switch, and the periphery indicates the temperatures by different position and different color lights.

Preferably, the upper cover has an S-shaped cooling air channel inside, and the S-shaped cooling air channel is arranged at a lower end of the nozzle that after a folded state.

By means the technical solutions above, the S-shaped cooling air channel can make the atomized high-temperature gas through the cooling air channel and then through the nozzle to reach the mouth, so there will no a phenomenon of burning the mouth occur, the use of more safe and reliable.

Preferably, the nozzle is made of food-grade glass, food-grade plastic or food-grade metal.

By means the technical solutions above, the material of the nozzle adopts food-grade glass, plastic or metal, which can be better used and will not cause any harm to human body.

Preferably, the insulation part is made of high temperature resistant plastics, ceramics or woods; the metal container is made of high thermal conductivity metals, and the spherical beads are glass beads or ceramic beads.

By means the technical solutions above, the insulation part can play a very good insulation effect, to avoid damage to surrounding components caused by high temperature inside the metal container, the metal container can conduct the heat around the halogen lamp to the atomized materials, and thus achieve the effect of conduction heating.

The spherical beads can absorb the conduction heat energy stored around the halogen lamp, the cold airflow is converted into the hot airflow through the spherical beads to reach the atomized materials during suction, thus achieving convection heating effect.

Working principle: when using the portable evaporator, first turn the nozzle to a suitable angle through the rotary shaft, so as to adjust the nozzle to a familiar angle in line with an individual, and then start the halogen lamp by pressing the switch button, the halogen lamp generates heat to the atomized materials contained inside the metal container, so that the internal atomized materials are heated and atomized, and the radiation energies are made to reach the atomized materials directly through the halogen lamp to achieve the effect of using radiation heating. Besides, the metal container itself as a high thermal conductivity metal can also conduct heat around the halogen lamp to reach the atomized materials, and then achieve the effect of conduction heating. The spherical beads outside the metal container are glass beads or ceramic beads, etc., which can absorb the conduction heat stored around the halogen lamp. And during suction, the cold airflow is converted into hot airflow through the spherical beads to reach the atomized materials, thus achieving the effect of convection heating. The atomized materials is exported from the opening of the upper end of the metal container, and then reaches the upper end of the upper cover through the insulation part, the air-passing part, and the rotating fastener, and last reaches the mouth through the S-shaped cooling air channel and nozzle, so that there will be no the phenomenon of burning the mouth occur.

II. Advantageous Effects

The present disclosure provides the portable evaporator with following advantageous effects.

1. The portable evaporator provided by the present disclosure, which uses the halogen lamp as the heat source therein, and is able to work at higher temperatures due to the higher melting point of the tungsten filaments, thus obtaining higher brightness, color temperature and luminous efficiency than the incandescent lamps. And because the halogen lamp has higher brightness and longer service life than the incandescent lamps, it can extend the service life of the heat appliance.

2. The portable evaporator provided by the present disclosure, the metal container with high thermal conductivity is provided inside the heating appliance and the through-hole is opened at the upper end of the heating appliance. The top makes radiant energies to reach to atomized materials directly by the halogen lamp, to achieve the effect of heating by using radiation. Moreover, the metal container itself as the high thermal conductivity metal can also conduct the heat around the halogen lamp to the atomized materials, and then achieve the effect of conduction heating. And the spherical beads are arranged outside the halogen lamp, the spherical beads may be glass beads or ceramic beads, etc., which can absorb the conduction heat stored in around the halogen lamp. During suction, the cold airflow through the spherical beads into the hot airflow to reach the atomized materials, and then achieve the effect of convection heating. By heating the atomized materials inside the container in various forms, it can carry out all-round uniform heating, thus achieving a better heating effect.

3. The portable evaporator provided by the present disclosure, the entire nozzle assembly are fixed at the upper end of the upper cover, the nozzle inside the upper end of the upper cover are rotating fixed by the rotary shaft, and the direction of the nozzle is adjusted to the familiar angle in line with the individual. The nozzle may be folded by turning it when not in use, thus reducing the size of the appliance and making it more convenient for storage.

4. The portable evaporator provided by the present disclosure, the entire nozzle assembly is fixed on the upper cover, and the S-shaped cooling air channel is arranged on the nozzle, which can make the atomized high-temperature gases through the cooling air channel through the nozzle to the mouth, and will not occur the phenomenon of burning the mouth, so that the use of more safe and reliable. The upper cover is provided with lug boss to seal the entire airway by sealing the gap between the rotary shaft and the upper.

5. The portable evaporator provided by the present disclosure, the upper end of the upper cover seal is provided with magnets, in use, the magnets can be adsorbed with the iron battery cover, so that the entire nozzle assembly is easily disassembled, which in turn facilitates the addition of atomized materials to the inside of the container, and thus the operation is more convenient.

| | | |
|---|---|---|
| 1 Nozzle; | 2 rotary shaft; | 3 upper cover; |
| 4 rotary shaft silicone sealant; | 5 Magnets; | 6 Seal; |
| 7 rotating fastener; | 8 air-passing part; | 9 first fixed screw; |
| 10 battery cover; | 11 Fastener; | 12 insulation part; |
| 13 battery; | 14 metal container; | 15 halogen lamp; |
| 16 spherical beads; | 17 ceramic lamp holder; | 18 connecting posts; |
| 19 Housing; | 20 airway silica gel; | 21 battery electrode; |
| 22 bottom airway; | 23 switch button; | 24 lower cover; |
| 25 second fixed screw; | 26 PCBA circuit board; | 27 charging port; |
| 28 S-shaped cooling air channel. | | |

DETAILED DESCRIPTION

The technical solution in the embodiments of the present disclosure will be clearly and completely described below in conjunction with the accompanying drawings. Obviously, the described embodiments are only a part of the embodiments of the present disclosure, and not all of them. Based on the embodiments of the present disclosure, all other embodiments obtained by one of ordinary skill in the art without making creative labor fall within the scope of protection of the present disclosure.

Embodiments

Figure 1:
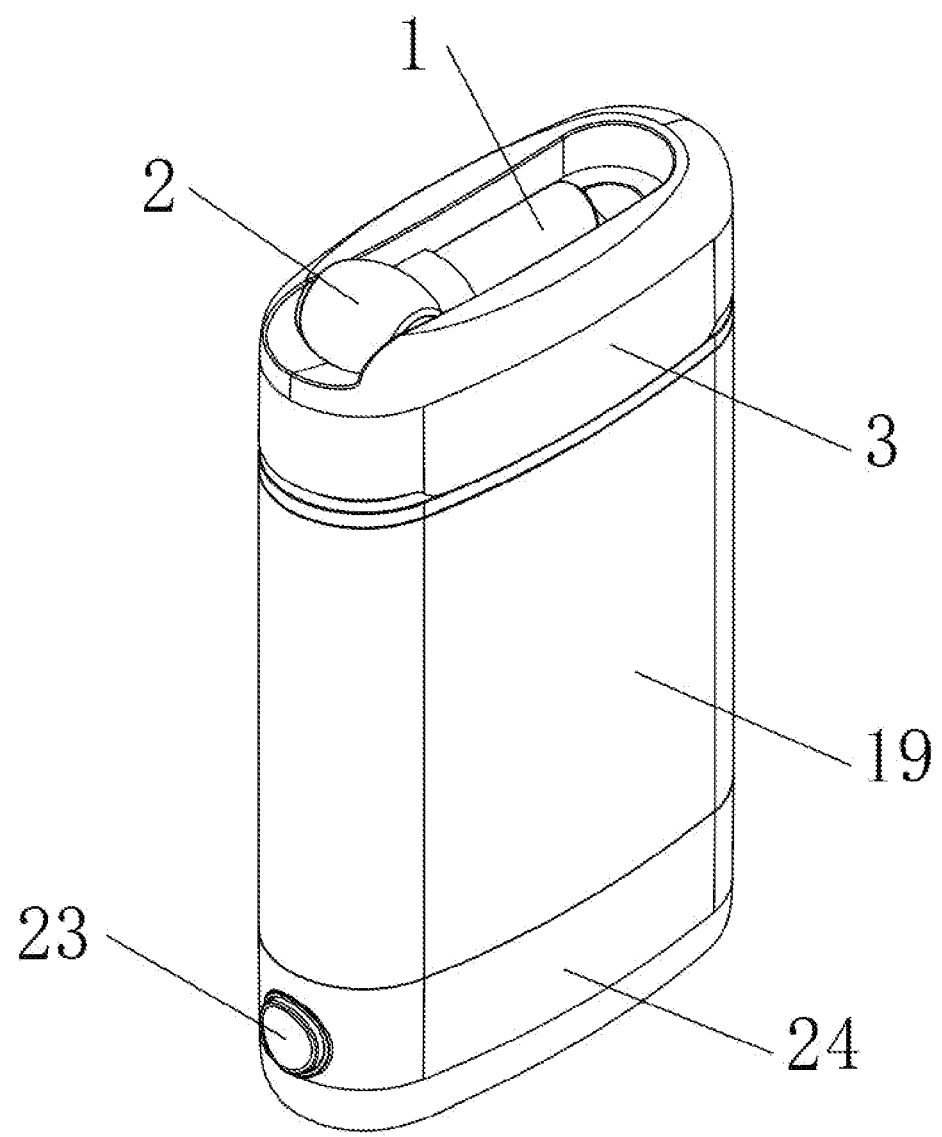
FIG. 1 shows a front axial view of the portable evaporator of the present disclosure.
Figure 2:
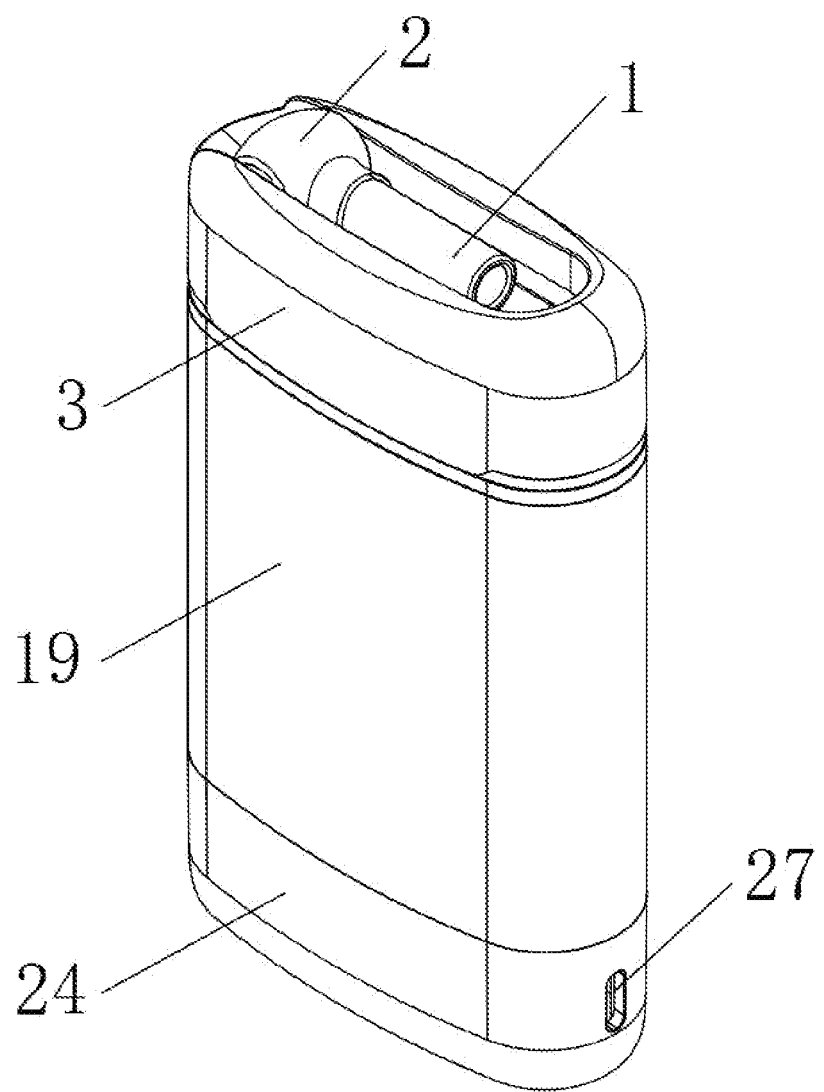
FIG. 2 shows a real axial view of the portable evaporator of the present disclosure.
Figure 3:
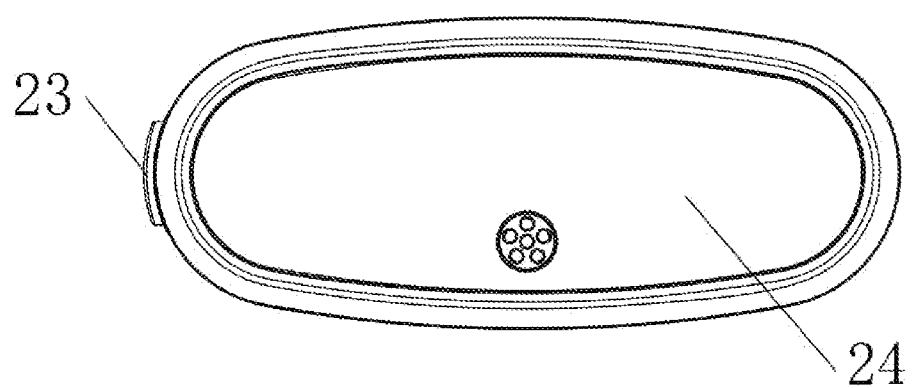
FIG. 3 shows a bottom view of the portable evaporator of the present disclosure.
Figure 4:
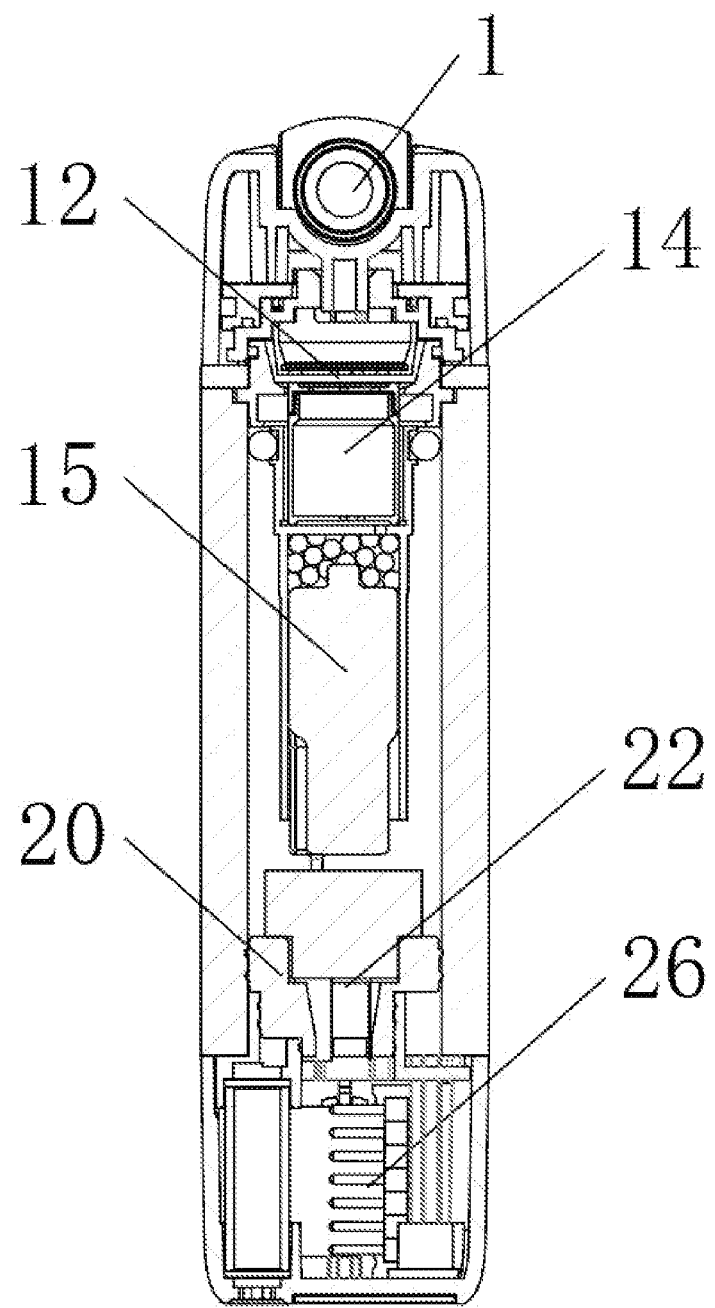
FIG. 4 shows a side sectional view of the portable evaporator of the present disclosure.
Figure 5:
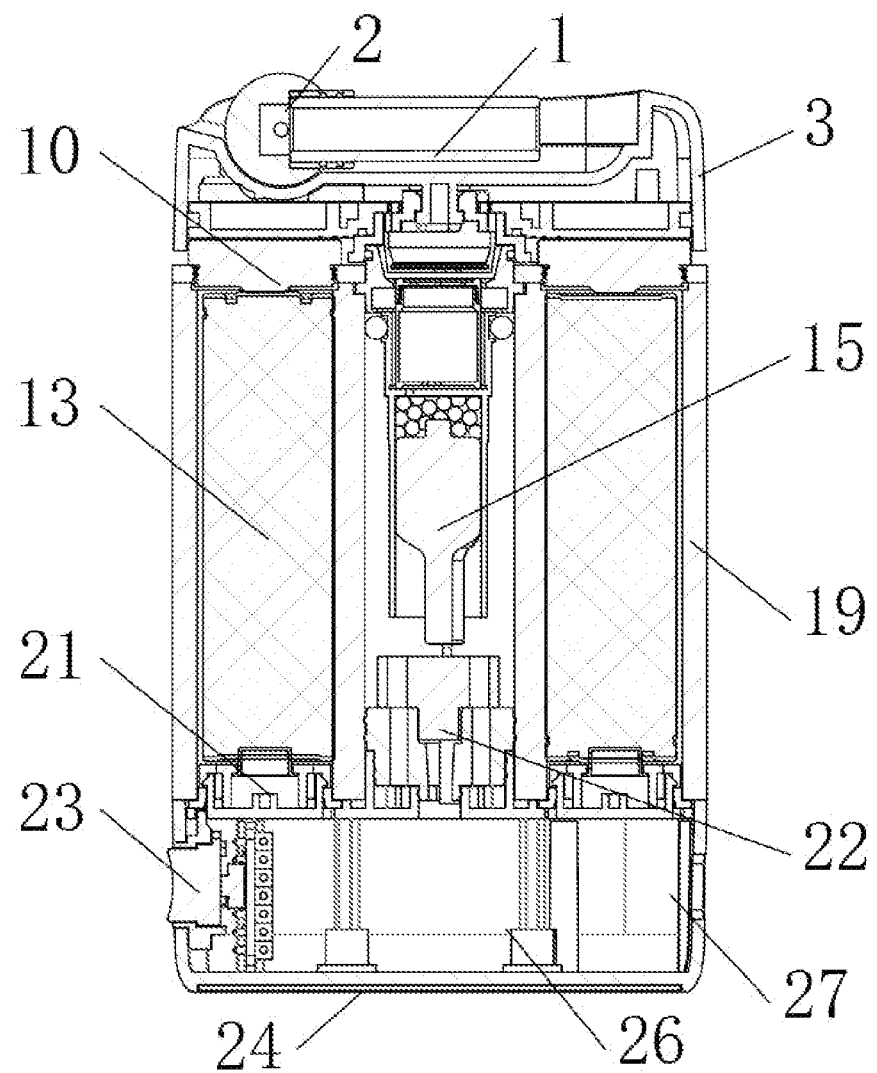
FIG. 5 shows a front sectional view of the portable evaporator of the present disclosure.
Figure 6:
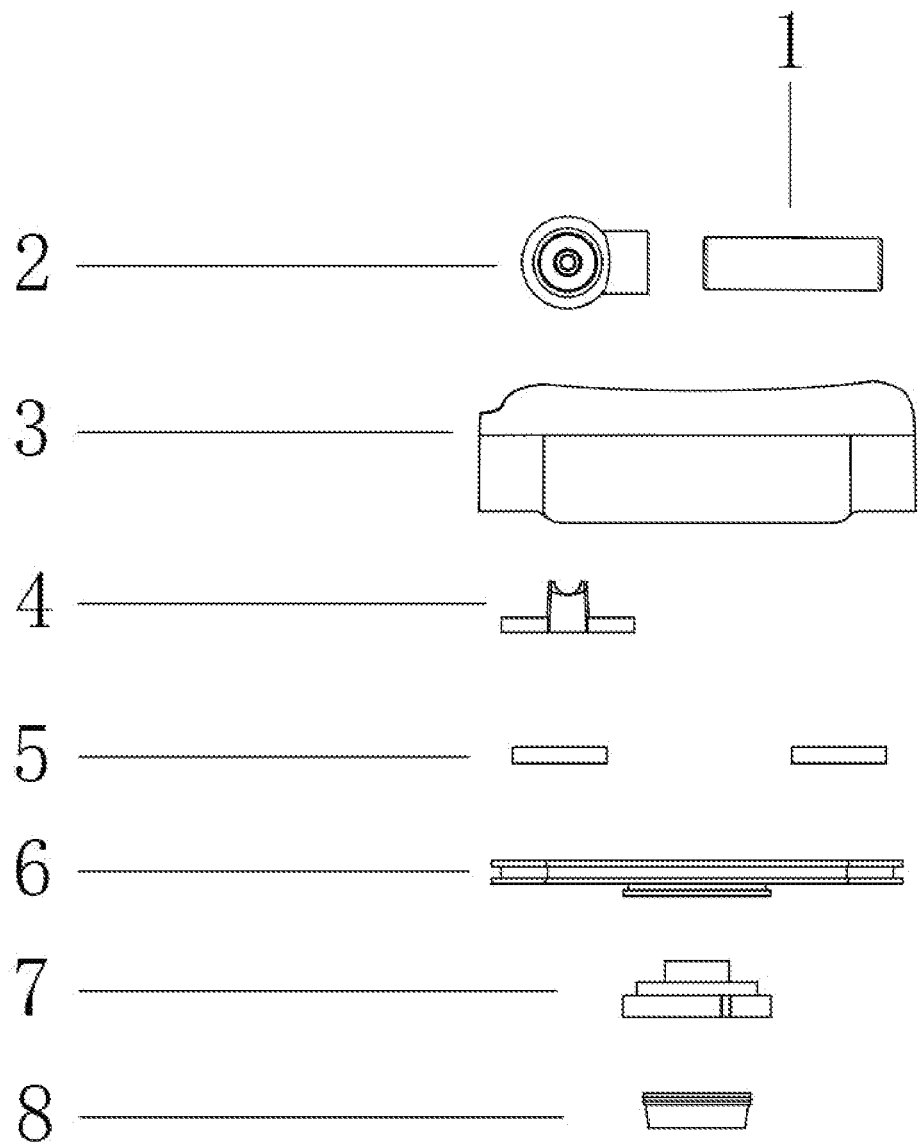
FIG. 6 shows an exploded view of the upper cover of the present disclosure.
Figure 7:
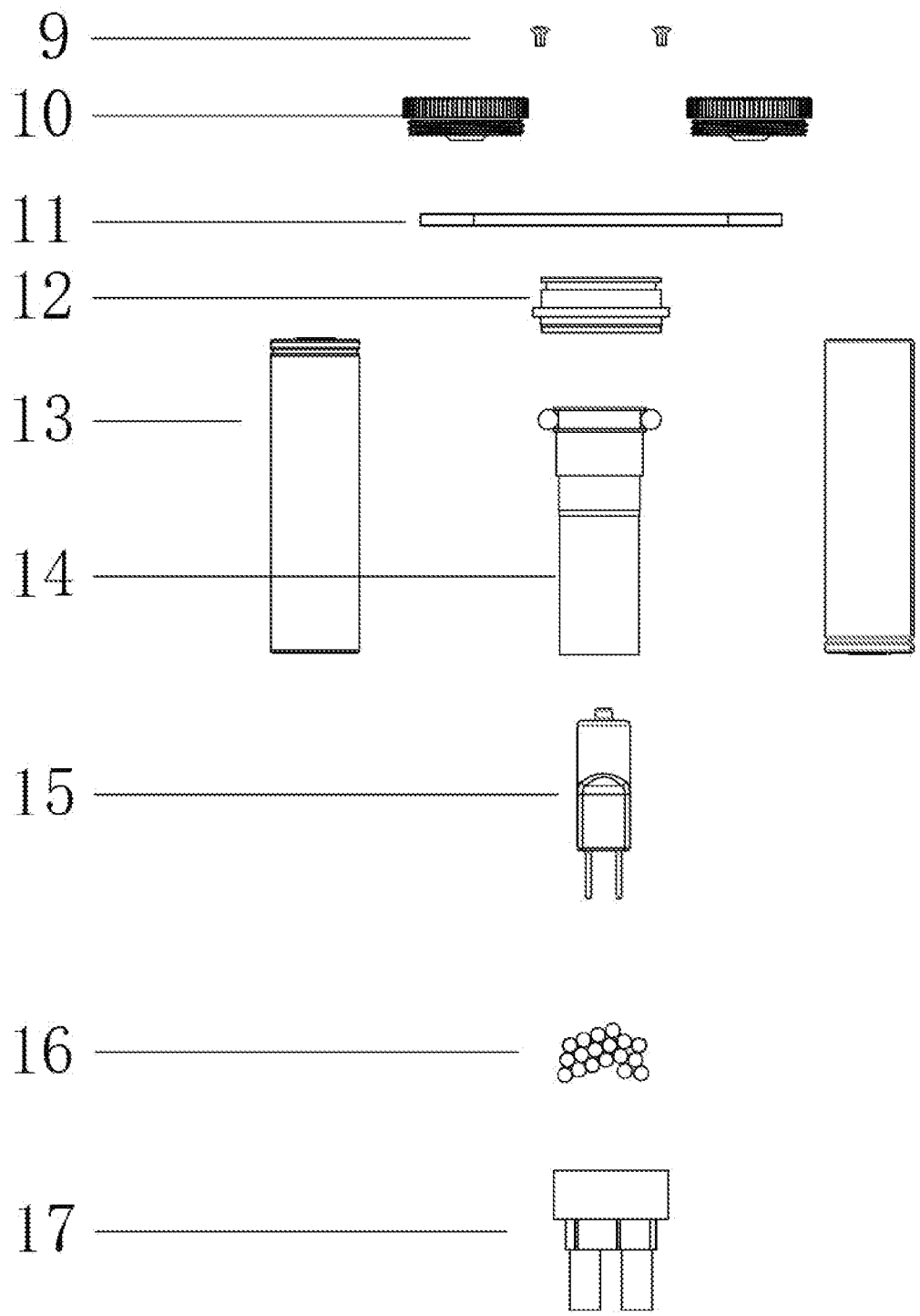
FIG. 7 shows an exploded view of the housing of the present disclosure.
Figure 8:
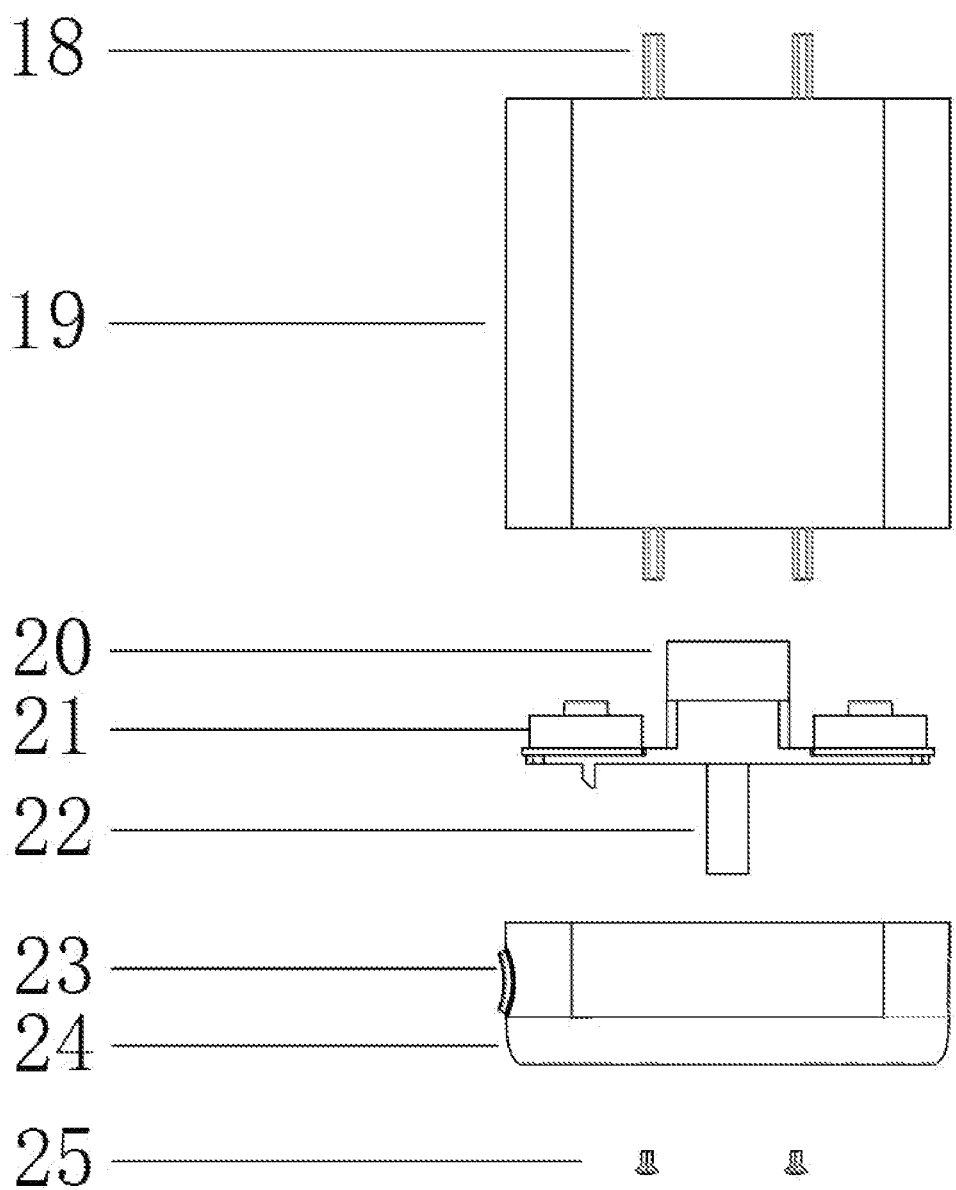
FIG. 8 shows an exploded view of the lower cover of the present disclosure.
Figure 9:
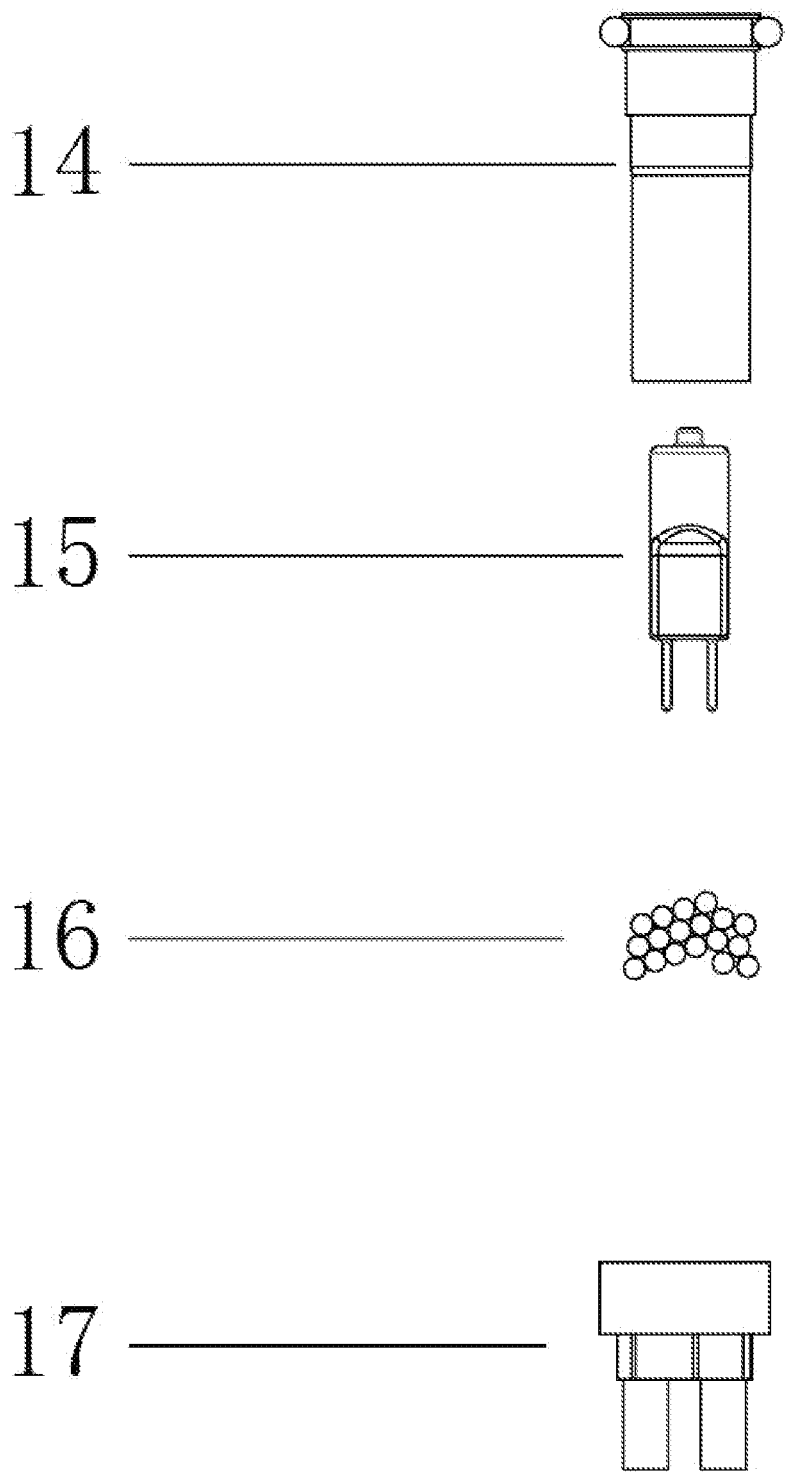
FIG. 9 shows an exploded view of a heat emitter assembly of the present disclosure.
Figure 10:
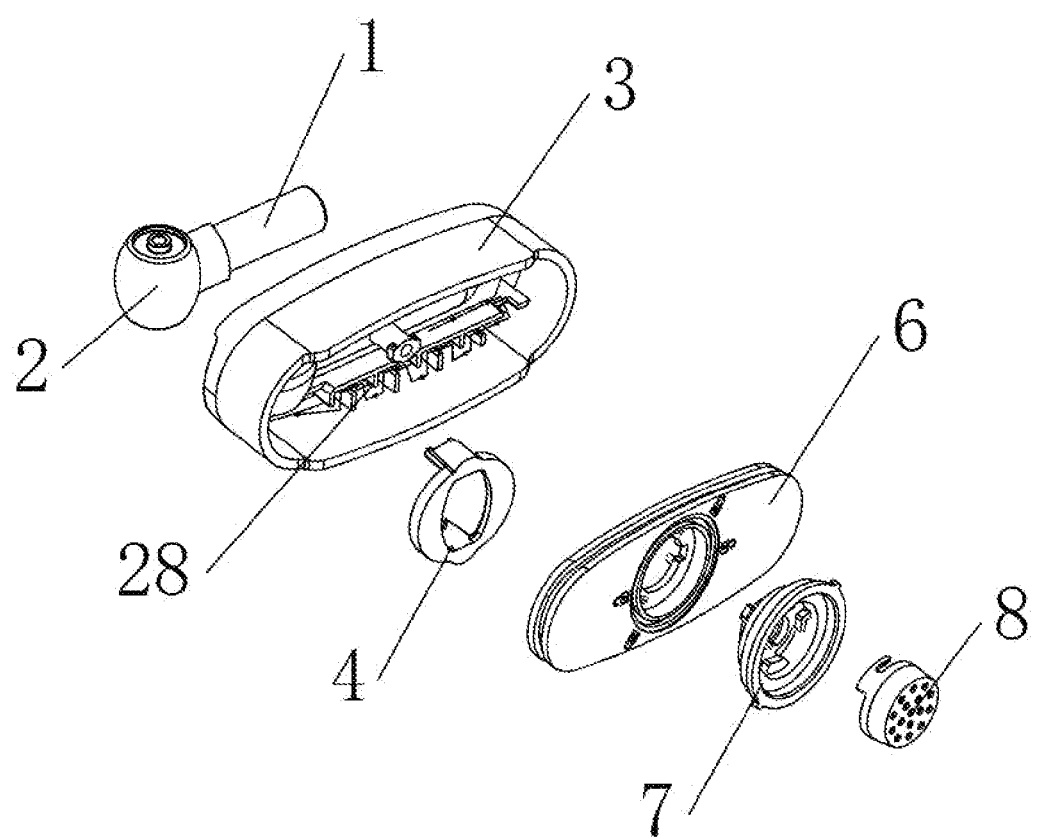
FIG. 10 shows an exploded axonometric view of the upper cover of the present disclosure.
Figure 11:
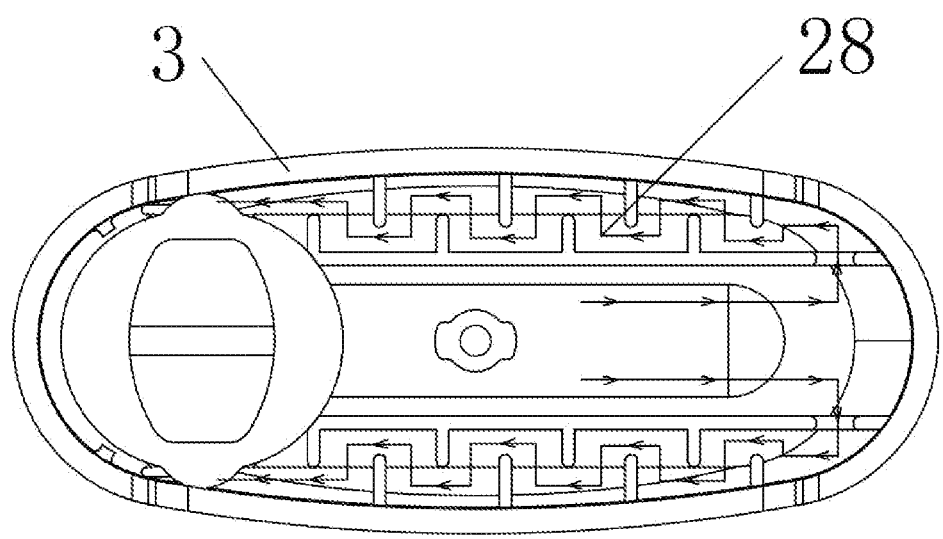
FIG. 11 shows a schematic diagram of the S-shaped cooling air channel structure of the present disclosure.

As shown in FIG. 1 to FIG. 11, the present disclosure provides a portable evaporator, including an upper cover 3, a housing 19 and a lower cover 24. Upper and lower ends of the housing 19 are fixedly connected with connecting posts 18, the lower end of the housing 19 is fixedly connected with the lower cover 24 through the connecting posts 18, and the upper end of the housing 19 is fixedly connected with a fastener 11 through a first fixing screw 9. A middle of a lower end of the fastener 11 is fixedly connected with an insulation part 12, and a lower end of the insulation part 12 is fixedly connected with a metal container 14. An outer wall of the metal container 14 is fixedly connected with a halogen lamp 15, the halogen lamp 15 outside is nested with spherical beads 16, and an outer wall of the spherical beads 16 are movable provided with a ceramic lamp holder 17. A lower end of the metal container 14 is fixedly connected with an airway silica gel 20, a lower end of the airway silica gel 20 is fixedly connected with a bottom airway 22, and both sides of the airway silica gel 20 each is fixedly provided with a battery electrode 21.

A side of an upper end of the upper cover 3 is rotationally connected with a rotary shaft 2, and a side of the rotary shaft 2 is fixedly connected with a nozzle 1. A side of an lower end of the upper cover 3 is fixedly provided with a rotary shaft silicone sealant 4, and the rotary shaft silicone sealant 4 is arranged opposite to the rotary shaft 2. The lower end of the upper cover 3 is fixedly provided with a seal 6, and a middle of a lower end of the seal 6 is fixedly provided with a rotating fastener 7.

The lower cover 24 is fixedly provided with a PCBA circuit board 26 inside, the PCBA circuit board 26 is electrically connected with the halogen lamp 15, and the lower cover 24 is fixedly connected with the housing 19 through a second fixed screw 25.

By means the technical solutions above, the halogen lamp 15 is used as the heat source inside the heat appliance, which can work at higher temperatures due to the higher melting point of the tungsten filaments, thus obtaining higher brightness, color temperature and luminous efficiency than the incandescent lamps. And because the halogen lamp 15 has higher brightness and longer service life than the incandescent lamps, it can extend the service life of the heat appliance.

The metal container 14 with high thermal conductivity is provided inside the heating appliance and the through-hole is opened at the upper end of the heating appliance. The top makes radiant energies to reach to atomized materials directly by the halogen lamp, to achieve the effect of heating by using radiation. Moreover, the metal container 14 itself as a high thermal conductivity metal can also conduct the heat around the halogen lamp 15 to the atomized materials, and then achieve the effect of conduction heating. And the spherical beads 16 are arranged outside the halogen lamp 15, the spherical beads 16 may be glass beads or ceramic beads, etc., which can absorb the conduction heat stored in around the halogen lamp 15. During suction, the cold airflow through the spherical beads 16 into the hot airflow to reach the atomized materials, and then achieve the effect of convection heating.

The battery electrode 21 on an upper end is fixedly provided with a battery 13, and the battery 13 on an upper end is sleeved with a battery cover 10, the battery cover 10 is threaded with an upper end of the fastener 11. In this way, it can easily take and replace the battery inside, the use effect is much better. Both sides of an upper end of the seal 6 are fixedly provided with magnets 5, in this way, the magnets can be attached to the iron battery cover, making the entire nozzle assembly easily removable, thus facilitating the addition of the atomized materials to inside of the metal container 14. A lower end of the rotating fastener 7 is fixedly provided with an air-passing part 8, and a bottom of the air-passing part 8 is connected to a top of the insulation part 12. In this way, the air-passing part 8 is fixed by riveting on the rotating fastener 7 and can be connected with lower end of the insulation part 12, so that the air passage inside the metal container 14 is connected with the air passage inside the upper cover 3. A side of the lower cover 24 is fixedly provided with a switch button 23, and other side of the lower cover 24 that away from the switch button is fixedly provided with a charging port 27, and the switch button 23 and the charging port 27 each is electrically connected with the PCBA circuit board 26. In this way, the switch button 23 controls the PCBA circuit board switch 26, and the periphery indicates the temperatures by different position and different color lights. The upper cover 3 has an S-shaped cooling air channel 28 inside, and the S-shaped cooling air channel 28 is arranged at a lower end of the nozzle 1 that after a folded state. In this way, the S-shaped cooling air channel 28 can make the atomized high-temperature gas through the cooling air channel and then through the nozzle 1 to reach the mouth, so there will no a phenomenon of burning the mouth occur, the use of more safe and reliable. The nozzle 1 is made of food-grade glass, food-grade plastic or food-grade metal. That is, the material of the nozzle adopts food-grade glass, plastic or metal, which can be better used and will not cause any harm to human body. The insulation part 12 is made of high temperature resistant plastics, ceramics or woods; the metal container 14 is made of high thermal conductivity metals, and the spherical beads are glass beads or ceramic beads. In this way, the insulation part 12 can play a very good insulation effect, to avoid damage to surrounding components caused by high temperature inside the metal container 14, the metal container 14 can conduct the heat around the halogen lamp 15 to the atomized materials, and thus achieve the effect of conduction heating. The spherical beads 16 can absorb the conduction heat energy stored around the halogen lamp 15, the cold airflow is converted into the hot airflow through the spherical beads 16 to reach the atomized materials during suction, thus achieving convection heating effect.

Although the embodiments of the present disclosure has been illustrated and described, it will be understood to one of ordinary skill in the art that any variations, modifications, replacements and variants of these embodiments may be made without departing from the principles and spirit of the present disclosure, the scope of the which is limited by the appended claims and their equivalents.

What is claimed is:
1. A portable evaporator, comprising an upper cover (3), a housing (19) and a lower cover (24); wherein
upper and lower ends of the housing (19) are fixedly connected with connecting posts (18), the lower end of the housing (19) is fixedly connected with the lower cover (24) through the connecting posts (18), and the upper end of the housing (19) is fixedly connected with a fastener (11) through a first fixing screw (9);
a middle of a lower end of the fastener (11) is fixedly connected with an insulation part (12), and a lower end of the insulation part (12) is fixedly connected with a metal container (14);
an outer wall of the metal container (14) is fixedly connected with a halogen lamp (15), the halogen lamp (15) outside is nested with spherical beads (16), and an outer wall of the spherical beads (16) are movable provided with a ceramic lamp holder (17);
a lower end of the metal container (14) is fixedly connected with an airway silica gel (20), a lower end of the airway silica gel (20) is fixedly connected with a bottom airway (22), and both sides of the airway silica gel (20) each is fixedly provided with a battery electrode (21);
a side of an upper end of the upper cover (3) is rotationally connected with a rotary shaft (2), and a side of the rotary shaft (2) is fixedly connected with a nozzle (1);
a side of a lower end of the upper cover (3) is fixedly provided with a rotary shaft silicone sealant (4), and the rotary shaft silicone sealant (4) is arranged opposite to the rotary shaft (2);
the lower end of the upper cover (3) is fixedly provided with a seal (6), and a middle of a lower end of the seal (6) is fixedly provided with a rotating fastener (7);
the lower cover (24) is fixedly provided with a PCBA circuit board (26) inside, the PCBA circuit board (26) is electrically connected with the halogen lamp (15), and the lower cover (24) is fixedly connected with the housing (19) through a second fixed screw (25).

2. The portable evaporator according to claim 1, wherein the battery electrode (21) on an upper end is fixedly provided with a battery (13), and the battery (13) on an upper end is sleeved with a battery cover (10), the battery cover (10) is threaded with an upper end of the fastener (11).

3. The portable evaporator according to claim 1, wherein both sides of an upper end of the seal (6) are fixedly provided with magnets (5).

4. The portable evaporator according to claim 1, wherein a lower end of the rotating fastener (7) is fixedly provided with an air-passing part (8), and a bottom of the air-passing part (8) is connected to a top of the insulation part (12).

5. The portable evaporator according to claim 1, wherein a side of the lower cover (24) is fixedly provided with a switch button (23), and other side of the lower cover (24) that away from the switch button (23) is fixedly provided with a charging port (27), and the charging port (27) is electrically connected with the PCBA circuit board (26).

6. The portable evaporator according to claim 1, wherein the upper cover (3) has an S-shaped cooling air channel (28) inside, and the S-shaped cooling air channel (28) is arranged at a lower end of the nozzle (1) that after a folded state.

7. The portable evaporator according to claim 1, wherein the nozzle (1) is made of food-grade glass, food-grade plastic or food-grade metal.

8. The portable evaporator according to claim 1, wherein the insulation part (12) is made of high temperature resistant plastics, ceramics or woods; the metal container (14) is made of high thermal conductivity metals, and the spherical beads (16) are glass beads or ceramic beads.

* * * * *